(12) United States Patent
Wang et al.

(10) Patent No.: US 11,171,385 B2
(45) Date of Patent: Nov. 9, 2021

(54) METHOD OF FORMING A SEPARATOR FOR A LITHIUM-ION BATTERY

(71) Applicant: GM Global Technology Operations LLC, Detroit, MI (US)

(72) Inventors: Hongliang Wang, Sterling Heights, MI (US); Brian J. Koch, Berkley, MI (US); Michael P. Balogh, Novi, MI (US); Sean R. Wagner, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 16/033,891

(22) Filed: Jul. 12, 2018

(65) Prior Publication Data

US 2020/0020907 A1 Jan. 16, 2020

(51) Int. Cl.
*H01M 10/0525* (2010.01)
*H01M 50/403* (2021.01)
*B23K 26/38* (2014.01)
*H01M 50/411* (2021.01)
*B23K 26/18* (2006.01)
*H01M 10/14* (2006.01)
(Continued)

(52) U.S. Cl.
CPC ........... *H01M 50/403* (2021.01); *B23K 26/18* (2013.01); *B23K 26/38* (2013.01); *H01M 10/0525* (2013.01); *H01M 50/411* (2021.01)

(58) Field of Classification Search
None
See application file for complete search history.

(56) References Cited

U.S. PATENT DOCUMENTS

| 2005/0208361 A1* | 9/2005 | Enjoji | B29C 65/44 |
| | | | 429/483 |
| 2014/0193716 A1* | 7/2014 | L'Abee | C08F 110/02 |
| | | | 429/247 |
| 2017/0028511 A1* | 2/2017 | Sieglinde | B23K 26/18 |

(Continued)

FOREIGN PATENT DOCUMENTS

| JP | 4882221 B2 * | 2/2012 | H01M 8/0228 |
| WO | WO-2018059971 A * | 4/2018 | H01M 10/0525 |

OTHER PUBLICATIONS

"Polymer Degradation." Wikipedia, Wikimedia Foundation, Mar. 18, 2018, web.archive.org/web/20180318035159/en.wikipedia.org/wiki/Polymer_degradation. (Year: 2018).*

(Continued)

*Primary Examiner* — Alison L Hindenlang
*Assistant Examiner* — Andrés E. Behrens, Jr.
(74) *Attorney, Agent, or Firm* — Quinn IP Law

(57) ABSTRACT

A method of forming a separator for a lithium-ion battery includes arranging a polymer film in contact with a sacrificial layer to form a cutting stack. The method includes disposing the cutting stack between a first vitreous substrate and a second vitreous substrate. The method includes applying an infrared laser to the cutting stack through the first vitreous substrate to generate heat at the sacrificial layer. The method also includes transferring heat from the sacrificial layer to the polymer film to thereby cut out a portion of the polymer film and form the separator. A method of cutting a polymer film and a cutting system are also explained.

11 Claims, 2 Drawing Sheets

(51) Int. Cl.
   *H01M 10/12* (2006.01)
   *H01M 10/04* (2006.01)

(56) References Cited

U.S. PATENT DOCUMENTS

2018/0226624 A1* 8/2018 Zhao ............... H01M 2/1653
2018/0337379 A1* 11/2018 Joo .................. H01M 50/403

OTHER PUBLICATIONS

"Ablation." Wikipedia, Wikimedia Foundation, Jun. 16, 2018, web.archive.org/web/20180616093955/en.wikipedia.org/wiki/Ablation. (Year: 2018).*

Choi, Ji-Ae, et al. "Enhancement of Thermal Stability and Cycling Performance in Lithium-Ion Cells through the Use of Ceramic-Coated Separators." Journal of Power Sources, vol. 195, No. 18, 2010, pp. 6192-6196., doi:10.1016/j.jpowsour.2009.11.020. (Year: 2010).*

Anwar, Muhammed. Research Gate, Feb. 22, 2016, www.researchgate.net/post/Is_laser_spot_size_beam_diameter_at_the_waist_depends_on_the_laser_intensity#:~:text=spot%20size%20is%20directly%20proportional,on%20the%20focusing%20lens.%22. (Year: 2016).*

Miraoui, Imed, et al. "High-Power Laser Cutting of Steel Plates: Heat Affected Zone Analysis." Advances in Materials Science and Engineering, vol. 2016, 2016, pp. 1-8., doi:10.1155/2016/1242565. (Year: 2016).*

"General Rotogravure Printing Machine AY600A/800A/110OA: Deguang." Zhejiang Deguang Machinery Co.,LTD., Sep. 25, 2016, cn-printingmachines.com/1-7-general-rotogravure-printing-machine.html. (Year: 2016).*

JP-4,882,221B2 (Yasuhiro) Nov. 2004 (online machine translation), [Retrieved on Dec. 29, 2020], Retrieved from: Espacenet (Year: 2004).*

"Electromagnetic Spectrum." Wikipedia, Wikimedia Foundation, Mar. 25, 2018, web.archive.org/web/20180325011732/en.wikipedia.org/wiki/Electromagnetic_spectrum. (Year: 2018).*

WO2018059971 (Juestel) Sep. 2016 (online machine translation), [Retrieved on Jul. 2, 2021], Retrieved from: Espacenet (Year: 2016).*

* cited by examiner

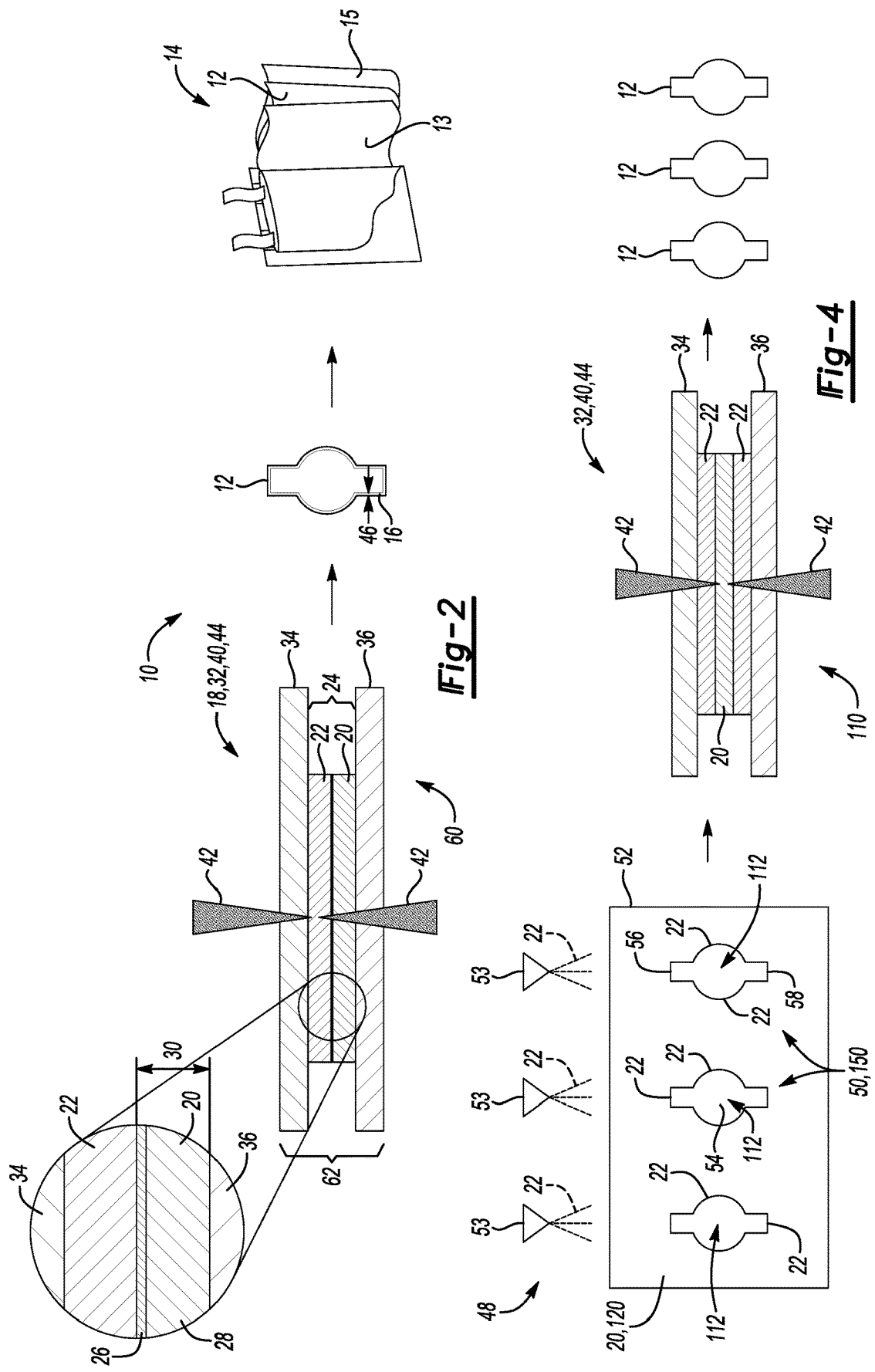

METHOD OF FORMING A SEPARATOR FOR A LITHIUM-ION BATTERY

INTRODUCTION

The disclosure relates to a method of forming a separator for a lithium-ion battery, a method of cutting a polymer film, and a cutting system for forming the separator.

Batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles. For example, secondary batteries for vehicle applications may be recharged external to the vehicle via a plug-in electrical outlet, or onboard the vehicle via a regenerative event.

One type of secondary battery, a lithium-ion battery, may include a negative electrode or anode, a positive electrode or cathode, and a separator disposed between the positive electrode and the negative electrode. The negative electrode may be formed from a material that is capable of incorporating and releasing lithium ions during charging and discharging of the lithium-ion battery. More specifically, during charging of the battery, lithium ions may move from the positive electrode to the negative electrode and embed in the material. Conversely, during battery discharge, lithium ions may be released from the material and move from the negative electrode to the positive electrode. The separator may be formed from a polymer and may be moistened with an electrolyte to promote the movement of lithium ions between the positive and negative electrodes.

SUMMARY

A method of forming a separator for a lithium-ion battery includes arranging a polymer film in contact with a sacrificial layer to form a cutting stack. The method includes disposing the cutting stack between a first vitreous substrate and a second vitreous substrate. The method also includes applying an infrared laser to the cutting stack through the first vitreous substrate to generate heat at the sacrificial layer. Further, the method includes transferring heat from the sacrificial layer to the polymer film to thereby cut out a portion of the polymer film and form the separator.

Applying may include accumulating heat at the sacrificial layer rather than at the polymer film.

Transferring may include ablating the polymer film. Transferring may convey heat to the polymer film without chemically degrading the polymer film such that the separator is free from a carbonaceous residue.

In one aspect, the polymer film may include a ceramic material disposed on a porous polyolefin sheet. Transferring may include removing the ceramic material without contaminating the porous polyolefin sheet. Transferring may not include melting the polymer film. Further, transferring may include maintaining a temperature of the polymer film of less than 1,000° C. to thereby avoid chemical degradation of the polymer film.

In another aspect, transferring may include minimizing a heat affected zone of the separator. Minimizing may include producing the heat affected zone having a width of less than or equal to 50 μm.

Arranging may include ink printing the sacrificial layer onto the polymer film. Ink printing may include depositing the sacrificial layer onto the polymer film in a repeated shape.

In a further aspect, arranging may include sandwiching the polymer film between two sacrificial layers. In an additional aspect, the method may include stacking a plurality of cutting stacks between the first vitreous substrate and the second vitreous substrate.

Further, applying may include contacting the infrared laser with the sacrificial layer at a speed of from 0.1 m/s to 5 m/s at a power of from 50 W to 500 W. In another aspect, applying may include contacting the cutting stack with electromagnetic radiation having a wavelength of from 150 nm to 20 μm.

A method of cutting a polymer film includes printing a sacrificial layer formed from an infrared electromagnetic radiation-absorbing material onto the polymer film in a pattern to form a blank. The method also includes disposing the blank between a first vitreous substrate and a second vitreous substrate. In addition, the method includes applying an infrared laser along the pattern through the first vitreous substrate to generate heat at the sacrificial layer. The method further includes transferring heat from the sacrificial layer to the polymer film along the pattern to thereby cut out a portion of the polymer film.

Disposing may include stacking a plurality of blanks between the first vitreous substrate and the second vitreous substrate.

In one aspect, the pattern may include a circle having a first wing extending from the circle and a second wing extending from the circle and spaced apart from the first wing. Transferring may include precisely conveying heat along the first wing, the second wing, and the circle without conveying heat to a remainder of the polymer film.

A cutting system for forming a separator of a lithium-ion battery includes a workpiece. The workpiece includes a first vitreous substrate formed from glass and a second vitreous substrate formed from glass. The workpiece also includes a cutting stack disposed between and in contact with the first vitreous substrate and the second vitreous substrate. The cutting stack includes a polymer film including a ceramic material disposed on a porous polyolefin sheet. The polymer film has a thickness of from 20 μm to 30 μm. The cutting stack also includes at least one sacrificial layer disposed on the polymer film and formed from an infrared electromagnetic radiation-absorbing material. Further, the cutting system includes an infrared laser configured for emitting electromagnetic radiation having a wavelength of from 1,000 nm to 1,200 nm through the first vitreous substrate to thereby generate heat at the sacrificial layer.

In one aspect, the cutting stack may further include the polymer film disposed between and in contact with two sacrificial layers.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 2 is a schematic illustration of a cross-sectional and partially exploded view of a portion of the method of FIG. 1.

FIG. 4 is a schematic illustration of a cross-sectional view of a further embodiment of the method of FIG. 1.

DETAILED DESCRIPTION

Figure 1:
FIG. 1 is a flowchart of a method of forming a separator for a lithium-ion battery.

Referring to the Figures, wherein like reference numerals refer to like elements, a method 10 of forming a separator 12 (FIG. 2) for a lithium-ion battery 14 is shown generally in FIG. 1. The method 10 may be useful for applications requiring precisely-dimensioned separators 12 that are free from residues, contaminants, an excessive heat affected zone 16 (FIG. 2), imprecise or frayed edges, and the like. For example, the method 10 and separator 12 may be suitable for battery applications which require excellent power density and charge/discharge cycles. The method 10 may be economical in terms of time and cost, may be scalable to mass production manufacturing operations, may eliminate hand-cutting of battery separators 12, and may provide precisely- or intricately-cut, high-quality separators 12 at high throughput.

During operation of the lithium-ion battery 14, the separator 12 may be disposed between a cathode 13 (FIG. 2) and an anode 15 (FIG. 2) of the lithium-ion battery 14. The separator 12 may be moistened with an electrolyte, may physically separate the cathode 13 and the anode 15, and may promote a transfer of lithium ions between the cathode 13 and the anode 15. Further, although depicted and described herein as having a generally circular shape, the separator 12 may have any geometry. For example, the separator 12 may have a rectangular shape.

As such, the method 10 and separator 12 may be useful for vehicular applications such as, but not limited to, automobiles, buses, forklifts, motorcycles, bicycles, trains, trams, spacecraft, airplanes, farming equipment, boats, and submarines. Alternatively, the method 10 and separator 12 may be useful for non-vehicular applications such as stationary power generation, portable power generation, electronics, remote weather stations, communications centers, research stations, and the like. More specifically, by way of a non-limiting example, the method 10 and separator 12 may be useful for lithium-ion battery applications for non-autonomous, autonomous, or semi-autonomous vehicle applications. Alternatively, although not shown, besides lithium-ion battery applications, the method 10 and separator 12 may be useful for other types of batteries, transducers, fuel cells, and the like.

Referring now to FIGS. 1 and 2, the method 10 of forming the separator 12 for the lithium-ion battery 14 includes arranging 18 a polymer film 20 in contact with a sacrificial layer 22 to form a cutting stack 24. For example, the method 10 may include placing the sacrificial layer 22 adjacent and in contact with the polymer film 20 so that the sacrificial layer 22 covers at least a portion of the polymer film 20.

As described with reference to FIG. 2, the polymer film 20 includes a ceramic material 26 disposed on a porous polyolefin sheet 28 and has a thickness 30 of from 20 µm to 30 µm, e.g., 25 µm. In general, the polymer film 20 may be porous and mechanically- and thermally-stable. In other embodiments, the polymer film 20 may include other polymers such as, but not limited to, expanded polytetrafluoroethylene.

The ceramic material 26 of the polymer film 20 may include, for example, one or more non-metallic inorganic materials, metal oxides, and combinations thereof. For example, the ceramic material 26 may be aluminum oxide, silicon dioxide, magnesium oxide, lithium lanthanum titanate, lithium lanthanum zirconium oxide, and the like. In one example, the ceramic material 26 may be a composite. Generally, the ceramic material 26 may include a crystalline fraction of greater than or equal to 30 parts by volume based on 100 parts by volume of the ceramic material 26. The ceramic material 26 may be transparent to electromagnetic wavelengths from 100 nm (e.g., ultraviolet light) to 20 µm (e.g., far infrared light). Further, the porous polyolefin sheet 28 may be formed from polyethylene, polypropylene, and combinations thereof.

Referring again to FIG. 2, the sacrificial layer 22 may be arranged next to and in contact with the polymer film 20 and may therefore provide support and protection to the polymer film 20. In particular, the sacrificial layer 22 is formed from an infrared electromagnetic radiation-absorbing material. That is, the sacrificial layer 22 may be formed from a comparatively high-absorptive material including a pigment disposed on or in a sheet material. For example, the pigment may be, but is not limited to, carbon black, Mars black, nigrosin, 4,4',4"-tris(N,N-phenyl-3-methylphenylamino)triphenylammonium hexafluoroantimonate, and the like. A suitable example of the pigment is commercially available under the tradename Epolight™ 3072 from Epolin of Newark, N.J. Further, the sheet material may be formed from a porous substance defining pores, such as paper, and the pigment may be deposited and incorporated into the pores. Alternatively, the sheet material may be a thermoplastic substance such as polypropylene and the pigment may be mixed into the thermoplastic substance before forming the sheet material.

Figure 3:
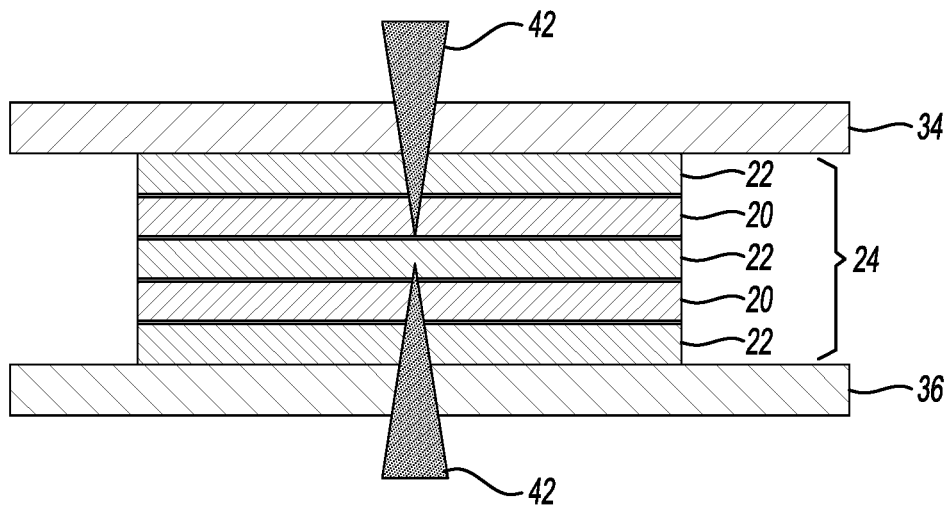
FIG. 3 is a schematic illustration of a cross-sectional view of another embodiment of a portion of the method of FIG. 1.

Referring now to FIG. 3, the cutting stack 24 includes at least one sacrificial layer 22 disposed on the polymer film 20. In some embodiments, the cutting stack 24 may include more than one sacrificial layer 22 and/or more than one polymer film 20. That is, arranging 18 (FIG. 1) may include sandwiching the polymer film 20 between two sacrificial layers 22. Such stacking 38 (FIG. 1) or sandwiching may be useful for applications requiring the cutting stack 24 to be exposed to comparatively high amounts of infrared electromagnetic radiation.

Referring again to FIGS. 1 and 2, the method 10 also includes disposing 32 the cutting stack 24 between a first vitreous substrate 34 and a second vitreous substrate 36. The first vitreous substrate 34 and the second vitreous substrate 36 may be formed from any laser-transparent, rigid material, such as glass and/or a composite. Further, the first vitreous substrate 34 and the second vitreous substrate 36 may be formed from different materials or the same material. As such, since the cutting stack 24 may be thin, disposing 32 the cutting stack between the first vitreous substrate 34 and the second vitreous substrate 36 may hold the cutting stack 24 in place to prevent slippage, distortion, and/or movement of the cutting stack 24. For embodiments including more than one cutting stack 24, the method 10 may further include stacking 38 (FIG. 1) a plurality of cutting stacks 24 between the first vitreous substrate 34 and the second vitreous substrate 36.

Referring again to FIGS. 1 and 2, the method 10 also includes applying 40 an infrared laser 42 to the cutting stack 24 through the first vitreous substrate 34 to generate heat at the sacrificial layer 22. That is, applying 40 may include accumulating heat at the sacrificial layer 22 rather than at the polymer film 20, as set forth in more detail below.

By way of non-limiting examples, applying 40 may include contacting the cutting stack 24 with electromagnetic radiation having a wavelength of from 150 nm to 20 μm, e.g., from 400 nm to 20 μm, or from 1,000 nm to 1,200 nm, or 1,064 nm. At wavelengths outside this range, e.g., at ultraviolet wavelengths, the electromagnetic radiation may char and/or chemically degrade the polymer film 20 and thereby provide a contaminated separator (not shown). Further, applying 40 may include contacting the infrared laser 42 with the sacrificial layer 22 at a speed of from 0.1 m/s to 5 m/s, e.g., 0.5 m/s, at a power of from 50 W to 500 W, e.g., 150 W. Likewise, applying 40 the infrared laser 42 for a longer duration and/or at a power outside the aforementioned range may also char and/or damage the polymer film 20 and render a degraded separator (not shown).

The method 10 also includes transferring 44 heat from the sacrificial layer 22 to the polymer film 20 to thereby cut out a portion 112 (FIG. 4) of the polymer film 20 and form the separator 12. That is, as described with reference to FIG. 2, the heat transferred from the sacrificial layer 22 to the polymer film 20 may cut the ceramic material 26 disposed on the porous polyolefin sheet 28 and therefore cut out the portion 112 (FIG. 4) from a remainder 120 (FIG. 4) of the polymer film 20.

More specifically, transferring 44 heat may not include melting and/or chemically degrading the polymer film 20 due to a short pulse of the infrared laser 42. Rather, transferring 44 heat may include ablating or thermally vaporizing the polymer film 20. In particular, transferring 44 may convey heat to the polymer film 20 without chemically degrading the polymer film 20 such that the separator 12 is free from a carbonaceous residue. Stated differently, transferring 44 may include removing, e.g., thermal vaporizing, the ceramic material 26 without contaminating the porous polyolefin sheet 28.

That is, since the ceramic material 26 may be transparent to the infrared laser 42, comparatively high laser power, e.g., from 50 W to 500 W, may be necessary to remove or break the ceramic material 26 disposed on the porous polyolefin sheet 28, which absorbs part of the laser energy, to cut the film 20 and form the separator 12. Without the presence of the sacrificial layer 22, such comparatively high laser power may otherwise cause chemical degradation of the porous polyolefin sheet 28 and contribute to the presence of the carbonaceous residue along a cut edge of the separator 12. However, the sacrificial layer 22 may absorb and accumulate heat generated by the infrared laser 42 and transfer the heat to the porous polyolefin sheet 28 without chemically degrading or melting the porous polyolefin sheet 28. As such, transferring 44 heat may remove the ceramic material 26 due to the short pulse, e.g., 9 ns, of the infrared laser 42. At the same time, transferring 44 heat may include maintaining a temperature of the polymer film 20 of less than 1,000° C., e.g., less than or equal to 200° C. or less than or equal to 300° C. or less than or equal to 500° C. or less than or equal to 700° C. or less than or equal to 900° C., to thereby avoid chemical degradation of the polymer film 20, i.e., so that the polymer film 20 may not melt and/or chemically degrade, but may rather ablate or thermally vaporize to form the separator 12.

Therefore, as described with reference to FIG. 2, transferring 44 heat may also include minimizing the heat affected zone 16 of the separator 12. That is, minimizing may include producing the heat affected zone 16 having a width 46 of less than or equal to 50 μm, e.g., less than or equal to 40 μm or less than or equal to 30 μm or less than or equal to 20 μm.

Figure 5:
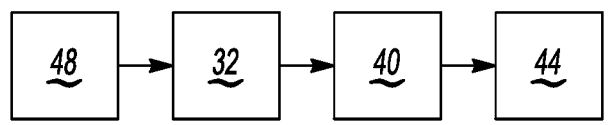
FIG. 5 is a flowchart of a method of cutting a polymer film.

In another embodiment described with reference to FIGS. 4 and 5, a method 110 of cutting the polymer film 20 includes printing 48 the sacrificial layer 22 formed from the infrared electromagnetic radiation-absorbing material onto the polymer film 20 in a pattern 50 to form a blank 52. That is, arranging 18 may include ink printing the sacrificial layer 22 onto the polymer film 20. For example, the sacrificial layer 22 may be deposited through nozzles 53 onto the polymer film 20 and then dried or cured on the polymer film 20. More specifically, ink printing may include depositing the sacrificial layer 22 onto the polymer film 20 in a repeated shape 150 or pattern 50 to serve as a guide for infrared radiation, as set forth in more detail below. That is, ink printing may include depositing the sacrificial layer 22 onto the polymer film 20 in a desired and repeated shape 150, e.g., reference electrodes. For example, the pattern 50 may include a circle 54 having a first wing 56 or tab extending from the circle 54 and a second wing 58 or tab extending from the circle 54 and spaced apart from the first wing 56. Alternatively, the pattern 50 may include a rectangle or other shape. Further, the pattern 50 may be repeated along the polymer film 20.

The method 110 also includes disposing 32 the blank 52 between the first vitreous substrate 34 and the second vitreous substrate 36. For some embodiments, disposing 32 may include stacking 38 a plurality of blanks 52 between the first vitreous substrate 34 and the second vitreous substrate 36.

Further, the method 110 includes applying 40 the infrared laser 42 along the pattern 50 through the first vitreous substrate 34 to generate heat at the sacrificial layer 22. That is, applying 40 may include absorbing heat at the sacrificial layer 22, i.e., along the pattern 50, rather than at the porous polyolefin sheet 28.

For this embodiment, the method 10 may also include stacking 38 a plurality of cutting stacks 24 between the first vitreous substrate 34 and the second vitreous substrate 36. That is, the method 10 may include placing the plurality of cutting stacks 24 adjacent and in contact with one another between the first vitreous substrate 34 and the second vitreous substrate 36.

In addition, the method 110 includes transferring 44 heat from the sacrificial layer 22 to the polymer film 20 along the pattern 50 to thereby cut out the portion 112 of the polymer film 20. For example, depending upon the shape of the pattern 50, transferring 44 may include precisely conveying heat along the first wing 56, the second wing 58, and the circle 54 without conveying heat to the remainder 120 of the polymer film 20. Therefore, since heat is solely conveyed along the pattern 50 instead of to the remainder 120, the method 110 may be useful for applications requiring intricately-shaped separators 12 and may produce a minimal scrap rate with no requirement for tooling changes between batches.

Referring again to FIG. 2, a cutting system 60 for forming the separator 12 of the lithium-ion battery 14 includes a workpiece 62. The workpiece 62 includes the first vitreous substrate 34 formed from glass, the second vitreous substrate 36 formed from glass, and the cutting stack 24 disposed between and in contact with the first vitreous substrate 34 and the second vitreous substrate 36. The cutting stack 24 includes the polymer film 20 and at least one sacrificial layer 22 disposed on the polymer film 20. For example, the cutting stack 24 may further include the polymer film 20 disposed between and in contact with two sacrificial layers 22. Further, the cutting system 60 includes the infrared laser 42 configured for emitting electromagnetic radiation having a wavelength of from 1,000 nm to 1,200 nm, e.g., 1,064 nm, through the first vitreous substrate 34 to thereby generate heat at the sacrificial layer 22.

Therefore, the method 10, 110 is economical, reproducible, and cost-effective and may consolidate or eliminate additional manufacturing processes to form the separator 12. As such, the method 10, 110 may be useful for applications requiring precisely-dimensioned separators 12 that are free from residues, contaminants, an excessive heat affected zone 16, and the like. For example, the method 10, 110, cutting system 60, and separator 12 may be suitable for battery applications which require excellent power density and charge/discharge cycles. More specifically, the method 10 may be economical in terms of time and cost, may be scalable to large manufacturing operations, and may provide precisely-cut and high-quality separators 12 for battery applications While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a separator for a lithium-ion battery, the method comprising: arranging a polymer film in contact with a sacrificial layer to form a cutting stack; wherein the polymer film includes a ceramic material disposed on a porous polyolefin sheet; disposing the cutting stack between a first vitreous substrate and a second vitreous substrate; applying an infrared laser to the cutting stack through the first vitreous substrate to generate heat at the sacrificial layer; accumulating heat at the sacrificial layer rather than at the polymer film such that the sacrificial layer absorbs heat generated by the infrared laser without chemically degrading or melting the polymer film; transferring heat from the sacrificial layer to the porous polyolefin sheet without chemically degrading or melting the polymer film; thermally vaporizing the polymer film by removing the ceramic material without contaminating the porous polyolefin sheet to thereby cut out a portion of the polymer film and form the separator, wherein the separator is free from a carbonaceous residue; and wherein the ceramic material is transparent to the infrared laser.

2. The method of claim 1, wherein transferring heat includes ablating the polymer film.

3. The method of claim 1, wherein transferring heat includes maintaining a temperature of the polymer film of less than 1,000° C. to thereby avoid chemical degradation of the polymer film.

4. The method of claim 1, wherein transferring includes minimizing a heat affected zone of the separator.

5. The method of claim 4, wherein minimizing a heat affected zone includes producing the heat affected zone having a width of less than or equal to 50 µm.

6. The method of claim 1, wherein arranging includes ink printing the sacrificial layer onto the polymer film.

7. The method of claim 6, wherein ink printing includes depositing the sacrificial layer onto the polymer film in a repeated shape.

8. The method of claim 1, wherein arranging includes sandwiching the polymer film between two sacrificial layers.

9. The method of claim 1, further including stacking a plurality of cutting stacks between the first vitreous substrate and the second vitreous substrate.

10. The method of claim 1, wherein applying an infrared laser includes contacting the cutting stack with electromagnetic radiation having a wavelength of from 150 nm to 20 µm.

11. The method of claim 1, wherein applying an infrared laser includes contacting the infrared laser with the sacrificial layer at a speed of from 0.1 m/s to 5 m/s at a power of from 50 W to 500 W.

* * * * *